Feb. 2, 1926.
A. W. WEBB, JR
1,571,825
SHOCK ABSORBER
Filed May 9, 1924
2 Sheets-Sheet 1
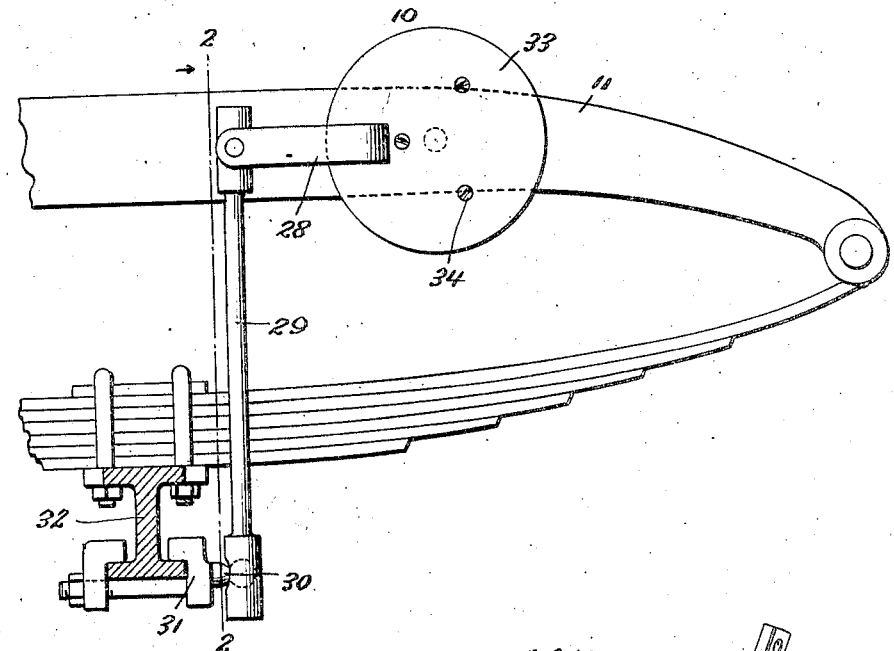
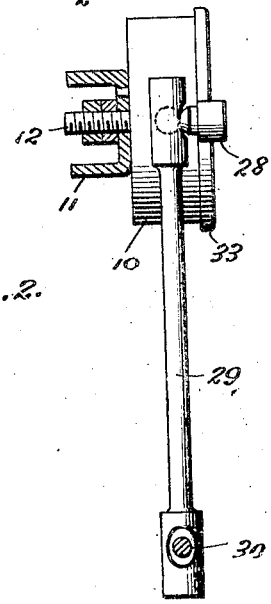
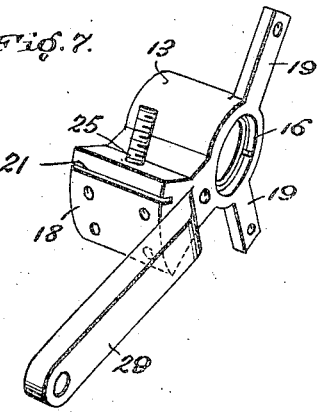
Archibald W. Webb Jr.,
INVENTOR
BY Victor J. Evans
ATTORNEY
WITNESS: Gerald Henners Feb. 2, 1926.  
A. W. WEBB, JR  
SHOCK ABSORBER  
Filed May 9, 1924
1,571,825
2 Sheets-Sheet 2
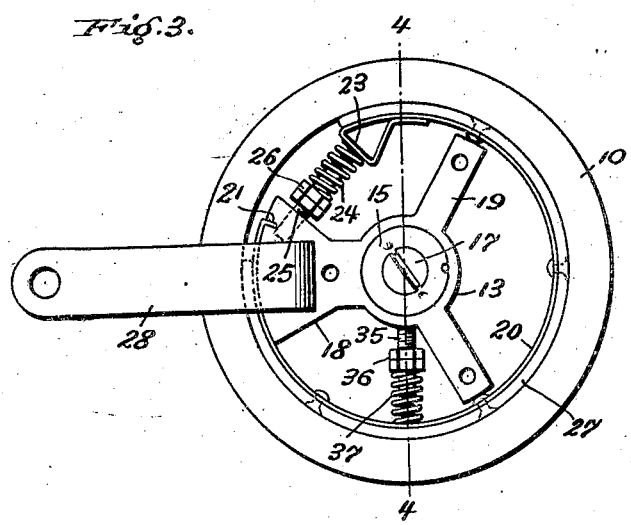
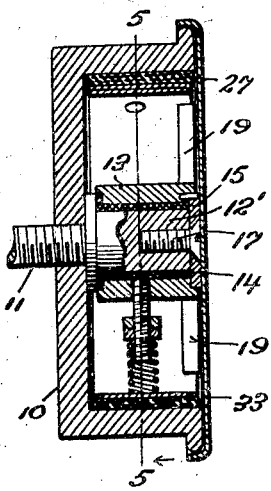
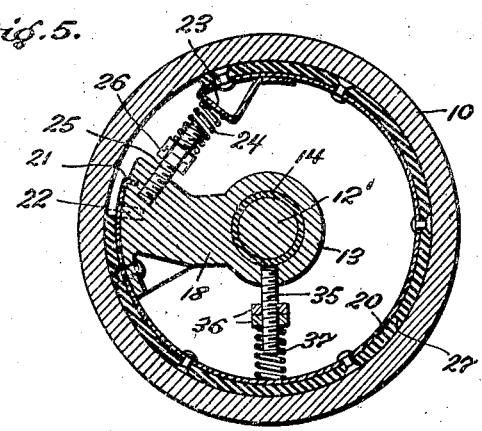
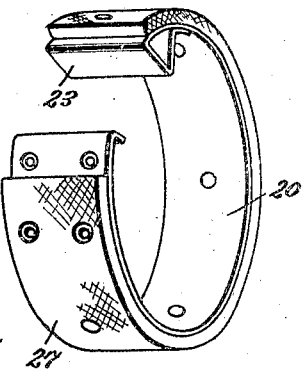
Archibald W. Webb, Jr.
INVENTOR
BY Victor J. Evans
ATTORNEY
WITNESS: Gerald Hennesy Patented Feb. 2, 1926.

1,571,825

UNITED STATES PATENT OFFICE.

ARCHIBALD WILSON WEBB, JR., OF FAWN GROVE, PENNSYLVANIA.

SHOCK ABSORBER.

Application filed May 9, 1924. Serial No. 712,103.

*To all whom it may concern:*

Be it known that I, ARCHIBALD W. WEBB, Jr., a citizen of the United States, residing at Fawn Grove, in the county of York and State of Pennsylvania, have invented new and useful Improvements in Shock Absorbers, of which the following is a specification.

This invention relates to improvements in shock absorbers for vehicles, an object being to provide a simple and durable device which may be easily applied to a vehicle and which will effectually and yieldingly resist vertical movement of the vehicle body occasioned by travel over rough and uneven surfaces.

To this end, the invention includes an expansible band which frictionally engages the inner surface of a relatively stationary drum, means being provided for adjustably regulating the degree of such engagement, while additional means is provided for insuring an even grip of the band within the drum.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation showing the invention applied.

Figure 2 is a section taken substantially on the line 2—2 of Figure 1.

Figure 3 is an enlarged elevation with the cover plate removed.

Figure 4 is a section on the line 4—4 of Figure 3 with the cover plate in place.

Figure 5 is a section on the line 5—5 of Figure 4.

Figure 6 is a detail perspective view of the expansible band.

Figure 7 is a perspective view of the carrier.

Referring to the drawings in detail wherein like characters of reference denote corresponding parts, the invention comprises a drum 10 which is adapted to be secured to the frame 11 of an automobile, the securing means preferably including a threaded stud 12 which extends through the base of the drum and is secured to the frame as shown in Figure 2 of the drawings.

The stud 12 carries at its inner end a post 12′ and rotatably mounted upon this post is a hub 13, a suitable bushing 14 being preferably interposed between the hub and post. A washer or cap 15 is positioned within a seat 16 provided in the outer end of the hub 13 and is removably secured to the post by means of a screw 17 and acts to retain the hub upon the post.

The hub is provided with radially extending arms 18 and 19 and the former has secured thereto one end of a split expansible band 20. For this purpose the arm 18 is provided with a transversely extending kerf or groove 21 which receives the inturned end of the band 20, while screws 22 serve to secure this end of the band to the arm 18. The opposite end of the band is shaped to provide an abutment 23 which is spaced from the arm 18 and against which bears one end of a spring 24. This spring is carried by a threadedly adjustable stud 25 which is mounted in the arm 18, while adjusting nuts 26 mounted upon the stud 25 serve to regulate the tension of the spring and consequently the degree of frictional engagement of the band with the internal periphery of the drum. A lining 27 is secured to the band 20 and provides frictional engagement between the band and drum.

Carried by the arm 18 is an extension or arm 28 which projects radially beyond the periphery of the drum and has pivotally secured thereto one end of a rod 29. The opposite end of this rod has a ball and socket connection 30 with a clamp 31 which is secured to the axle 32 of the vehicle.

The drum is closed by a cover plate 33, the latter being secured to the arms 18 and 19 by means of screws 34. This plate may be radially removed so that access may be had to the interior of the drum.

Extending radially from the hub 13 is a threaded stud 35 upon which are mounted adjusting nuts 36, while also mounted upon this stud and bearing against one of the nuts and the adjacent portion of the band 20 is a spring 37. This spring acts to yieldingly resist movement of the end of the band which is secured to the arm 18 and prevents this portion of the band from flexing to a greater extent than the remaining portion and thus provides for an even grip throughout the length of the band.

In the operation of the invention downward movement of the body of a vehicle to which the invention is applied will cause the band to contract against the action of the springs 24 and 37, the connection between the axle and the arm 28 serving to force this arm upward or in a direction opposite that indicated by the arrows in Figures 1 and 3. As rebound of the springs occurs, the band 20 will expand as the arm 28 moves in the direction indicated by the arrows in said figures, the band gripping the inner periphery of the drum and resisting rebound.

The invention is susceptible of various changes in its form, proportions and minor details of construction and the right is herein reserved to make such changes as properly fall within the scope of the appended claims.

Having described the invention what is claimed is:—

1. A shock absorber for vehicles comprising a drum adapted to be secured to the frame of a vehicle, an expansible split band located within and frictionally engaging the inner wall of the drum, a post mounted centrally within the drum, a hub mounted for rotation upon said post, an arm extending from said hub and connected to one end of the band, a spring interposed between said arm and the other end of the band to yieldingly force the latter into engagement with the drum, a threaded stud extending radially from the hub, a spring mounted upon the stud and engaging band adjacent one end of the latter to provide a uniform engagement between the band and drum, means mounted upon the stud to regulate the tension of the spring, a cover for the drum, an extension carried by the arm and projecting through the cover and means connecting the arm of the extension to the axle of the vehicle.

2. A shock absorber for vehicles comprising a drum adapted to be secured to the frame of a vehicle, an expansible split band located within and frictionally engaging the inner wall of the drum, a post mounted centrally within the drum, a hub mounted for rotation upon said post, an arm extending from said hub and connected to one end of the band, a spring interposed between said arm and the other end of the band to yieldingly force the latter into engagement with the drum, adjustable spring means connecting the hub and band adjacent one end of the latter to provide a uniform engagement between the band and drum, a cover for the drum, an extension carried by the arm and projecting through the cover and means connecting the extension to the axle of the vehicle.

In testimony whereof I affix my signature.

ARCHIBALD WILSON WEBB, Jr.